(12) United States Patent
Gernot

(10) Patent No.: US 11,307,016 B2
(45) Date of Patent: Apr. 19, 2022

(54) DEVICE AND METHOD FOR MEASURING THE CONCENTRICITY OF AN INTERNAL TOOTHING OF A SHAFT

(71) Applicants: THYSSENKRUPP PRESTA TECCENTER AG, Eschen (LI); thyssenkrupp AG, Essen (DE)

(72) Inventor: Voss Gernot, Veckenstedt (DE)

(73) Assignees: THYSSENKRUPP PRESTA TECCENTER AG, Eschen (LI); THYSSENKRUPP AG, Essen (DE)

(*) Notice: Subject to any disclaimer, the term of this patent is extended or adjusted under 35 U.S.C. 154(b) by 51 days.

(21) Appl. No.: 16/642,493

(22) PCT Filed: Aug. 28, 2018

(86) PCT No.: PCT/EP2018/073081
§ 371 (c)(1),
(2) Date: Feb. 27, 2020

(87) PCT Pub. No.: WO2019/042964
PCT Pub. Date: Mar. 7, 2019

(65) Prior Publication Data
US 2020/0256659 A1    Aug. 13, 2020

(30) Foreign Application Priority Data
Aug. 31, 2017 (DE) .................... 10 2017 215 285.0

(51) Int. Cl.
*G01B 5/20* (2006.01)
(52) U.S. Cl.
CPC .................................. *G01B 5/202* (2013.01)
(58) Field of Classification Search
USPC ............................................. 33/501.12, 543
See application file for complete search history.

(56) References Cited

U.S. PATENT DOCUMENTS 2,657,468 A * 11/1953 Lyons .................... G01B 5/252
33/543
2,700,224 A * 1/1955 Johnson ................. G01B 5/245
33/199 R (Continued)

FOREIGN PATENT DOCUMENTS

CN    203 083 480 U    7/2013
DE    18 02 363 B      3/1970

(Continued)

OTHER PUBLICATIONS

English Translation of International Search Report issued in PCT/EP2018/073081, dated Oct. 8, 2018.

*Primary Examiner* — Christopher W Fulton
(74) *Attorney, Agent, or Firm* — thyssenkrupp North America, LLC

(57) ABSTRACT

A device and a method can be utilized to measure concentricity of an internal toothing of a component. Such a device may include a determination segment, which can determine a concentricity deviation, that includes a spindle unit comprising a tapping spindle with a gauge gear wheel arranged thereon and intended for tapping the concentricity of the internal toothing, and an output spindle for transmitting the tapped concentricity from the tapping spindle to a measuring unit. The output spindle may be arranged directly or indirectly on the tapping spindle. A spindle holder may hold and position the tapping spindle, the output spindle, or the spindle unit. An adjusting element may position the gauge gear wheel, and the measuring unit may compare the tapped concentricity with reference values.

11 Claims, 5 Drawing Sheets

(56) References Cited

U.S. PATENT DOCUMENTS

| | | | | |
|---|---|---|---|---|
| 2,725,637 A | * | 12/1955 | Johnson | G01B 5/252 33/548 |
| 2,726,456 A | * | 12/1955 | Pergande | G01B 5/20 33/501.19 |
| 3,280,467 A | | 10/1966 | Motz | |
| 3,469,321 A | * | 9/1969 | Riddell | G01B 5/252 33/501.11 |
| 3,583,072 A | | 6/1971 | Muller | |
| 4,137,641 A | * | 2/1979 | Lauri | G01B 7/312 33/543 |
| 4,403,860 A | * | 9/1983 | Pryor | G01B 11/00 33/542 |
| 4,679,330 A | * | 7/1987 | Williams | G01B 5/252 33/550 |
| 5,419,056 A | * | 5/1995 | Breitenstein | G01B 5/252 33/549 |
| 6,901,797 B2 | * | 6/2005 | Hyatt | G01B 13/10 33/543 |
| 8,621,951 B2 | * | 1/2014 | Meier | F16H 55/18 74/409 |
| 2009/0048799 A1 | * | 2/2009 | Kadowaki | G01B 5/252 702/95 |
| 2011/0232116 A1 | | 9/2011 | Nagata | |

FOREIGN PATENT DOCUMENTS

| | | |
|---|---|---|
| DE | 16 23 234 A | 4/1971 |
| DE | 2 36 585 A | 6/1986 |
| JP | 2002-228438 A | 8/2002 |

* cited by examiner

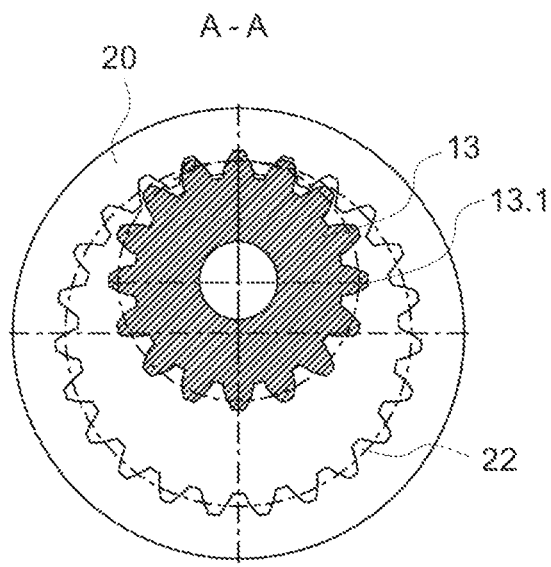
Fig. 9
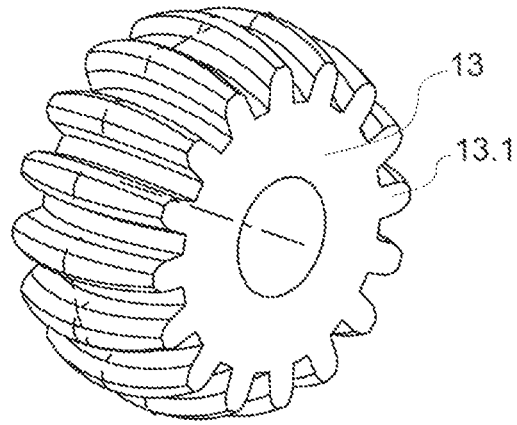
Fig. 10
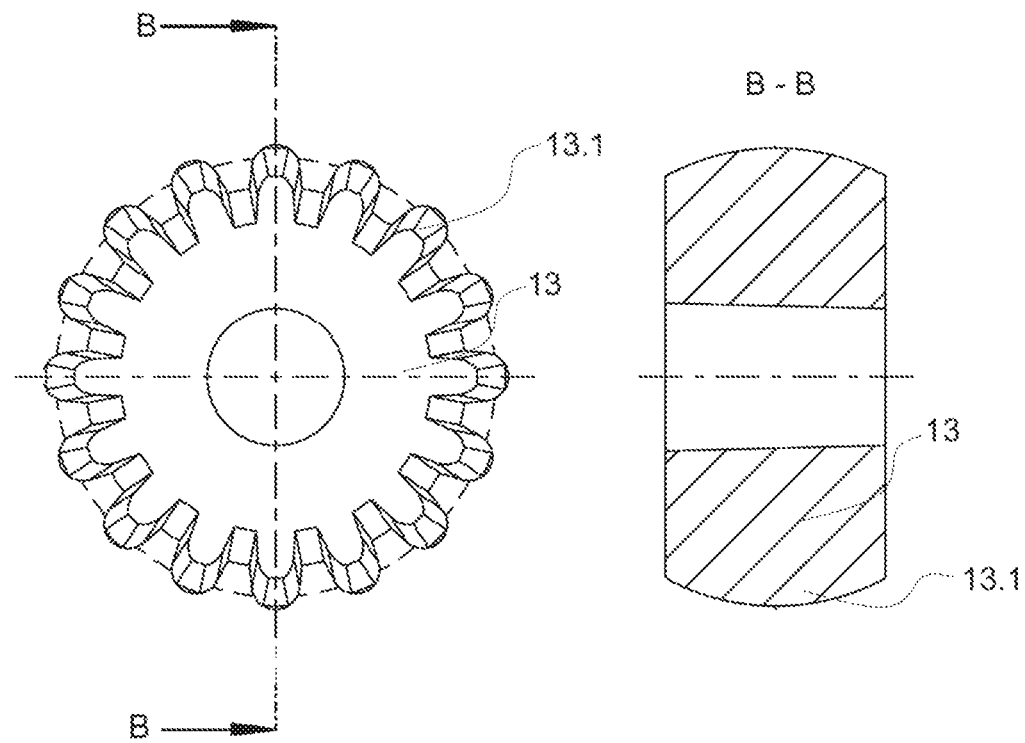
Fig. 11
Fig. 12

DEVICE AND METHOD FOR MEASURING THE CONCENTRICITY OF AN INTERNAL TOOTHING OF A SHAFT

CROSS REFERENCE TO RELATED APPLICATIONS

This application is a U.S. National Stage Entry of International Patent Application Serial Number PCT/EP2018/073081, filed Aug. 28, 2018, which claims priority to German Patent Application No. DE 10 2017 215 285.0, filed Aug. 31, 2017, the entire contents of both of which are incorporated herein by reference.

FIELD

The present disclosure generally relates to methods and devices for measuring the concentricity of internal toothings of shafts.

BACKGROUND

It is fundamentally known that the technically very complicated laser technique has to be used when measuring the concentricity of internal toothings, in particular having small diameters, which are primarily situated deep in the cavity of the shaft, said technique particularly involving a required 100% measurement check of the internal toothing. These checks or measurements are very time-consuming. In addition, the measurement method by means of laser is associated with the disadvantage that, in the case of components which are for example still wetted with machining media, said method does not deliver precise measurement values and therefore cannot be applied before the component has been cleaned to remove these machining media in a cost- and time-intensive manner. In particular, the internal toothings situated deep in the cavity of the component, such as a shaft, are, as fundamentally known, able to be measured only with great difficulty. It can also be considered to be fundamentally known that use is made for this purpose of coordinate-measuring machines whose measuring method is very time-consuming and therefore in turn very cost-intensive.

Thus a need exists for improved devices and methods for measuring the concentricity of an internal toothing, for example of a shaft. In particular, a need exists to provide a device and a method for measuring the concentricity of an internal toothing that make it possible in a simple and cost-effective manner even to measure an internal toothing formed deep in cavities of the component, in particular to measure the concentricity of said internal toothing, even if the internal toothing itself has a small-sized diameter.

Those having ordinary skill in the art will understand that features and details here that are described in conjunction with example devices also apply of course in conjunction with the example methods, and vice versa. In addition, the example methods can be carried out by way of the example devices. It is furthermore conceivable that the example methods and devices can also be applied for measuring the concentricity of an external toothing of a component, such as a shaft.

BRIEF DESCRIPTION OF THE FIGURES

FIG. 9 is a cross-sectional view of a section AA of the example shown in FIG. 7 of a device for concentricity measurement with an example gauge gear wheel disposed in an engagement position.

FIG. 10 is a perspective view of the example shown in FIG. 9 of a gauge gear wheel.

FIG. 11 is a cross-sectional view of the example shown in FIG. 10 of a gauge gear wheel.

FIG. 12 is a sectional view of a section B-B of the example gauge gear wheel shown in FIG. 11.

DETAILED DESCRIPTION

Figure 1:
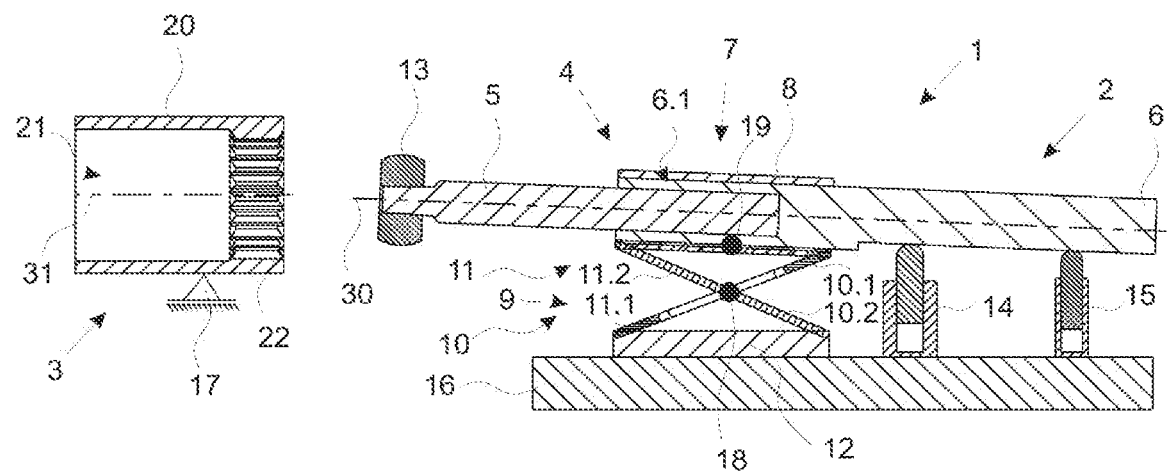
FIG. 1 is a lateral sectional view of an example device for concentricity measurement having a gauge gear wheel disposed in the inoperative position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to example devices for measuring the concentricity of internal toothings of shafts. In some examples, a device may include a determination segment comprising a spindle unit, a spindle holder, an adjusting element, and a measuring unit. The present disclosure further generally relates to methods for measuring the concentricity of internal toothings of shafts by way of devices for concentricity measurement.

The device according to the invention for measuring the concentricity of an internal toothing of a component, in particular a shaft, comprises at least one determination segment for determining a concentricity deviation. The determination segment comprises at least one spindle unit which comprises a tapping spindle having a gauge gear wheel arranged on a first, in particular first axial, end of the tapping spindle and intended for tapping the concentricity of the internal toothing of the component, and an output spindle for transmitting the tapped concentricity from the tapping spindle to a measuring unit. Here, the measuring unit itself advantageously takes the form of a measuring sensor or pin feeler or a comparable apparatus. The output spindle is advantageously arranged directly or indirectly on a second, in particular second axial, end of the tapping spindle that is situated opposite to the first end of the tapping spindle. A contact between the tapping spindle and the output spindle is not required, but is also not ruled out. Furthermore, the determination segment comprises a spindle holder at least for holding and positioning the tapping spindle or the output spindle, advantageously the spindle unit, and also an adjusting element at least for positioning at least the gauge gear wheel connected to the tapping spindle, and the measuring unit for example for comparing the tapped concentricity with reference values.

The adjusting element is advantageously a cylinder, particularly advantageously a pneumatic cylinder, such as a gas pressure cylinder, with the use of a hydraulic cylinder or an electrically actuatable actuator also being conceivable. The adjusting element advantageously serves to move or deflect the spindle unit from its inoperative position into a retracted position and advantageously also to move the spindle unit again from the retracted position into an engagement position or measuring position. The adjusting element is advantageously assisted here by the spindle holder which allows the rotational movement of the spindle unit about a preferably freely movable, that is to say nonstatic, rotation point, with the result that said spindle unit can be displaced or moved into different positions. Furthermore, the spindle holder advantageously serves to receive the tapping spindle and the output spindle in such a way that a rotational movement of the tapping spindle about its tapping spindle longitudinal axis is allowed and a transmission of deflections and movements introduced into the tapping spindle to the output spindle occurs. Accordingly, the tapping spindle and the output spindle are advantageously operatively connected to one another via the spindle holder, in particular in order to be able to transfer the determined concentricity of the internal toothing as far as the measuring unit starting from the gauge gear wheel. The output spindle is advantageously arranged in a rotationally fixed manner, with the result that a nonrotational tapping of the deflection of the spindle unit by means of the measuring unit can occur. It is also conceivable that the tapping spindle is at least partially received in the output spindle, with the result that the output spindle comprises a bearing portion for the tapping spindle. Both spindles, in other words the tapping spindle and the output spindle, advantageously extend coaxially to one another. The tapping spindle is advantageously designed to be rotational and is adapted to the rotational movement of the component, which is advantageously a shaft, particularly advantageously a hollow shaft with an internal toothing. The output spindle is advantageously arranged in a torsionally rigid manner and is pressed or clamped in the spindle holder at least in certain portions. The gauge gear wheel comprises for example an involute toothing by means of which a process-reliable engagement of the toothing of the gauge gear wheel with the internal toothing to be measured is allowed, substantially independently of the positionally correct positioning of the gauge gear wheel in the engagement position. The gauge gear wheel is advantageously designed as a globoidal gauge gear wheel. A process-reliable meshing engagement of the teeth of the toothing of the gauge gear wheel in the internal toothing is thereby allowed.

The device according to the invention is advantageously suitable for measuring the concentricity of an internal toothing of a component, said internal toothing for example being arranged deep in a cavity of the component, such as a through-hole of a hollow shaft, even if this internal toothing itself comprises only a small-sized diameter or a small axial extent.

Within the context of the invention, it is furthermore conceivable that the device additionally comprises a component-receiving segment for receiving the component, in particular a shaft, wherein the component-receiving segment comprises at least two bearing elements which are configured to be axially spaced apart from one another and intended for bearing and allowing a rotational movement of the component about its component longitudinal axis. It is advantageously conceivable that at least one of the bearing elements is a steady rest, with it also being possible for both of the bearing elements to be configured as steady rests. Use can be made here for example of clamping steady rests, annular steady rests, sliding steady rests, open steady rests, etc. It is also conceivable that at least one of the bearing elements is configured as a sliding bearing or rolling bearing. The arrangement of the bearing elements advantageously serves to hold the component in a defined position and to allow a rotary movement or rotational movement of the component about its component longitudinal axis, which is advantageously oriented parallel to the spindle unit longitudinal axis.

It is furthermore conceivable that the component-receiving segment comprises a drive unit for rotationally driving the component about its component longitudinal axis-. Accordingly, it is conceivable that the drive unit is an electric motor which is connected to the component, in particular a shaft, and whose rotor is operatively connected to the component in order to drive said component.

Within the context of the invention, it is also conceivable that the spindle holder comprises a spindle holder support at least for receiving the tapping spindle and the outlet spindle and a spindle holder base for moving, in particular for deflecting, the spindle unit. It is conceivable that the spindle holder support takes the form of a sleeve. The tapping spindle advantageously extends into one opening of the sleeve, whereas the output spindle extends into another opening of the sleeve. It is also possible that the spindle holder support is configured in the form of a parallelepiped having a hole, in particular a through-hole, for receiving the tapping spindle and the output spindle. The spindle holder support advantageously does not transmit any torque which is introduced by the tapping spindle into said support, but substantially a tilting moment, that is to say a rotary movement about a rotation point or an axis of rotation in the region of the direct or indirect connection between tapping spindle and output spindle lying on the spindle unit longitudinal axis on account of a deflection of the tapping spindle in the vertical direction.

It is also possible that the spindle holder base comprises at least one deflectable or at least partially bendable construction, in particular one which is at least partially elastically deformable or rotatable about an axis of rotation. It is accordingly conceivable that the spindle holder base also comprises more than one of the configurations, in particular two or all three configurations, and is therefore configured to be deflectable and rotatable or bendable and rotatable or bendable and deflectable or deflectable, bendable and rotatable. The configuration of the spindle holder base, in particular its functionality, is substantially dependent on the materials and components used. It is thus for example possible to configure the spindle holder base in the form of a rocker joint, advantageously a ball joint, about which the spindle unit, which then acts as a rocker, rotates or tilts. The rocker joint also advantageously serves to allow a defined pressing force of the gauge gear wheel on the internal toothing of the component.

It is also conceivable that the spindle holder base comprises a lever arm construction having support rods which cross one another in a plane extending in the axial direction of the spindle unit longitudinal axis. Two planes are advantageously defined which are respectively defined in the axial direction along the spindle unit longitudinal axis and orthogonally thereto in the vertical direction. The two planes are designed to be parallel to one another and orthogonally to the spindle unit longitudinal axis, as viewed in the horizontal direction, spaced apart from one another. In each case two support rods which cross one another are advantageously arranged in both planes.

It is advantageously conceivable that at least one of the support rods of the spindle holder base comprises a spring joint. This spring joint advantageously serves to allow an elastic bending or deformation of the support rod in a defined region. By virtue of the bending of the support rod there is also allowed a tilting movement of the spindle unit about a defined rotation point in order to move the spindle unit for example from its inoperative position into a retracted position. A support rod therefore advantageously comprises a corresponding spring element for each plane. It is also conceivable that all support rods comprise a spring element. The spring element of the support rods also serves for example to allow a defined pressing force of the gauge gear wheel on the internal toothing of the component. The support rods advantageously extend between the spindle holder support and a bottom element which is arranged vertically spaced apart from the spindle holder support and which is advantageously defined as a carriage arranged on linear rails. It is also conceivable that the support rods are designed as a V-shape for each plane and the V-shape tip runs in a ball joint or tilting joint. This allows tilting of the spindle holder support. It is also conceivable that one of the support rods comprises a V-shape for each plane, whereas the second of the support rods comprises an inverted V-shape for each plane, wherein the two support rods are arranged vertically above one another for each plane and their V-shape tips are aligned in a common joint. If required, the support rods can also be introduced at the V-shape ends into corresponding bearings allowing a defined movement. The movements are to be understood for example as rotary, tilting or pivoting movements or translational movements.

Within the scope of the invention, it is also conceivable that the spindle holder base is configured as a measuring carriage.

It is alternatively conceivable that the spindle holder base is a plate section construction having plate sections which cross one another in a crossing axis, wherein the crossing axis extends horizontally and orthogonally to the spindle unit longitudinal axis. The crossing axis is advantageously a virtual axis which produces no actual connection between the plate sections. Here, one plate section advantageously extends through an opening of the other plate section. The plate sections are formed for example in such a way that their surface extends orthogonally to the spindle unit longitudinal axis, as viewed in the horizontal direction, and so as to run in a sloping vertical direction. At least one of the plate sections is advantageously a spring steel element and therefore comprises a defined elastic deformability. This elastic deformability serves to allow a tilting movement of the spindle unit about a preferably nonstatic, in particular foreseeable, virtual rotation point in order to move the spindle unit, in particular the gauge gear wheel, for example from its inoperative position into a retracted position.

As already mentioned, it is conceivable that the spindle holder is arranged on a carriage which is movable in the axial direction along a longitudinal axis of the spindle unit, in particular the spindle unit longitudinal axis. The carriage is advantageously arranged to slide or else roll in or on linear rails. Here, the linear rails are also oriented along the spindle unit longitudinal axis and accordingly extend parallel to this spindle unit longitudinal axis. In particular an orientation or displacement of the spindle unit along the spindle unit longitudinal axis, in particular relative to the measuring unit and/or the adjusting element, is conceivable by means of the carriage.

Alternatively or additionally, it is possible that the determination segment or the component-receiving segment is arranged on a holding table which is steplessly movable in one, advantageously two, three or, more particularly advantageously, in six degrees of freedom. It is possible by means of the holding table to freely move the entire determination segment relative to the component-receiving segment or the component-receiving segment relative to the determination segment in order to introduce the gauge gear wheel into a cavity of the component having the internal toothing to be measured. It is also conceivable that both the determination segment and the component-receiving segment are received on a correspondingly formed holding table.

Within the context of the invention, it is furthermore possible that the adjusting element and the measuring unit are arranged on the output spindle, advantageously on an axial end of the output spindle, and are operatively connected to the output spindle. This is advantageously the axial end of the output spindle that is situated opposite to the axial end of the output spindle and that is connected, in particular operatively connected, to the spindle holder, in particular the spindle holder support.

The method according to the invention for measuring the concentricity of an internal toothing of a component, in particular a shaft, occurs according to the invention by means of a device for measuring the concentricity of an internal toothing of a component, as stated above. Here, the method according to the invention comprises at least the following steps in the corresponding order:

a) actuating the adjusting element to deflect the spindle unit in such a way that the gauge gear wheel is moved from an inoperative position into a retracted position, b) introducing the gauge gear wheel into a cavity, which has the internal toothing to be measured, of the component, c) renewed actuating of the adjusting element for renewed deflection of the spindle unit in such a way that the gauge gear wheel is moved from a retracted position into an engagement position in which the gauge gear wheel comes into at least partial meshing engagement with at least one portion of the internal toothing, d) driving the component to generate a rotational movement of the component about its component longitudinal axis, and e) detecting the concentricity of the internal toothing by means of the gauge gear wheel.

When actuating the adjusting element, this adjusting element is advantageously activated or deactivated, whereby the spindle unit is tilted or rotated about an in particular virtual, primarily nonstatic or else defined and fixed rotation point, with the result that the spindle unit is also therefore moved from an inoperative position into a retracted position. Here, the gauge gear wheel is moved for example in the vertical direction. The retracted position of the gauge gear wheel corresponds to a position in which a collision between the gauge gear wheel and a wall of the component when introducing the gauge gear wheel into the cavity having the internal toothing is avoided. It is conceivable that the component and therefore the component-receiving segment are moved toward the spindle unit having the gauge gear wheel and therefore toward the determination segment, or the determination segment is moved toward the component-receiving segment, or both segments, that is to say the component-receiving segment and the determination segment, can be moved jointly toward one another in order to allow the gauge gear wheel to be introduced into the cavity having the internal toothing. If the gauge gear wheel has been introduced into the cavity of the component having the internal toothing to be measured, there occurs renewed actuation of the adjusting element. Accordingly, it is possible that the adjusting element is activated or deactivated. As a result, the spindle unit is deflected again in such a way that the gauge gear wheel is brought from a retracted position into an engagement position in which the teeth of the gauge gear wheel come into meshing engagement with the internal toothing.

Accordingly, it is furthermore conceivable that, before step a), namely the first actuation of the adjusting element, or between steps a) and b), namely before introducing the gauge gear wheel into the cavity, having an internal toothing to be measured, of a component, the component is introduced into a component-receiving segment and oriented with respect to the determination segment in such a way that the longitudinal axis of the component and the nondeflected spindle unit longitudinal axis are aligned with one another or extend at least parallel to one another. The component is thereby advantageously brought into a suitable position for measuring the concentricity of the internal toothing.

In order to detect the concentricity of the internal toothing, the component, which is for example a shaft, is caused to turn or rotate about its component longitudinal axis. Within the context of the invention, the longitudinal axis of the component is to be understood as that axis of the component along which there extends the cavity of the component within which the internal toothing to be measured is formed. During the rotation of the component about its longitudinal axis, the gauge gear wheel arranged in meshing engagement with the internal toothing is therefore also caused to rotate about its axis of rotation which corresponds to the spindle unit longitudinal axis. In the region of concentricity defects of the internal toothing of the component, the gauge gear wheel, and therefore the tapping spindle connected to the gauge gear wheel, are oriented substantially vertically, that is to say displaced or moved from the prevailing engagement position in the vertical direction.

After step e), in a step f), the detected concentricity is advantageously transmitted from the gauge gear wheel, and the tapping spindle connected to the gauge gear wheel, to the output spindle in such a way that the measuring unit operatively connected to the output spindle detects deviations in the concentricity. This means that this deflection is transmitted from the tapping spindle to the output spindle, since both spindles are at least operatively connected to one another via the spindle holder, in particular the spindle holder support. Accordingly, the output spindle therefore also experiences a deflection which it then transmits to the measuring unit. The measuring unit detects this deflection as a deviation in the concentricity. The measuring unit can determine, for example by means of a comparison unit, whether this deviation in the concentricity comprises values which lie within permitted limits. The comparison unit can be connected to the measuring unit in a data-transmitting manner and therefore be a component designed separately from the measuring unit. It is also conceivable that the comparison unit is a constituent part of the measuring unit. The comparison unit compares the detected values of the concentricity measurement with reference values in order to be able to determine deviations in the concentricity of the internal toothing.

The method described affords all the advantages which have already been described in relation to the device for measuring the concentricity of an internal toothing according to the first aspect of the invention.

It will be understood that the features mentioned above and those still to be explained below can be used not only in the respectively specified combination but also in other combinations or on their own without departing from the scope of the present invention.

FIGS. 1 to 7 illustrate one embodiment of the device 1 according to the invention for measuring the concentricity of an internal toothing 22 of a component 20, such as a shaft shown here. The device 1 comprises a determination segment 2 and a component-receiving segment 3. The determination segment 2 comprises a spindle unit 4 which comprises a tapping spindle 5 and an output spindle 6. The tapping spindle 5 is arranged or received in the spindle holder 7, in particular in the spindle support holder 8, so as to be rotatable about the spindle unit longitudinal axis 30. For this purpose, it is conceivable that the spindle holder support 8 comprises a bearing element, such as a sliding bearing, a rolling bearing or a steady rest (not shown here). However, it is also possible that the tapping spindle 5 is at least partially arranged so as to be rotatable in the output spindle 6, as is visible in FIGS. 1, 3, 5, 6 and 7. Accordingly, the output spindle 6 forms a bearing portion 6.1 for bearing the rotatable output spindle 5. The spindle holder support 8 is advantageously designed in the geometric shape of a parallelepiped, but can also comprise a cylindrical shape. Of relevance for the spindle holder support 8 is at least the configuration of either a through-hole or one or more cavities or depressions by means of which an arrangement of the spindles, in particular the tapping spindle 5 and the output spindle 6, is made possible. The bearing element for bearing the rotatable tapping spindle 5 is advantageously arranged in a portion of such a hole, in particular the through-hole or continuous cavity or in one of the cavities. The output spindle 6 is advantageously connected to the spindle holder support 8 in a torsionally rigid manner. The output spindle 6 is advantageously clamped or pressed into the spindle holder support 8, in particular into a corresponding cavity provided for this purpose, or connected to the spindle holder support 8 in another force-fitting, form-fitting or integrally bonded manner. A gauge gear wheel 13 is arranged on a distal end or an axial end of the tapping spindle 5. This axial end is situated opposite to the axial end of the tapping spindle 5 by means of which the latter is connected to the spindle holder support 8. The gauge gear wheel 13 has advantageously been pressed onto the tapping spindle 5. However, it is also conceivable that the gauge gear wheel 13 is connected to the tapping spindle 5 in another form-fitting, force-fitting or even integrally bonded manner. The spindle holder support 8 is connected to the spindle holder base 9 of the spindle holder 7. The spindle holder base 9 comprises for example plate sections 10 which cross one another, in particular two plate sections 10.1 and 10.2 which cross one another, or support rods 11 which cross one another and are in each case arranged in two planes, in particular two support rods 11.1 and 11.2 which cross one another. When using two plate sections 10 which cross one another, one of the plate sections 10, for example the first plate section 10.1, extends through an opening (not shown here) in the other, in particular second plate section 10.2. At least one of the plate sections 10, particularly advantageously the first plate section 10.1, and advantageously also both plate sections 10, is/are advantageously elastically resilient plate sections 10 which are produced for example from a spring steel. The plate sections 10 each extend in a plane which, on the one hand, fans out orthogonally to the spindle unit longitudinal axis 30 and, on the other hand, fans out in the vertical direction. The plate sections 10 themselves run obliquely vertically in this plane at a defined angle.

In the configuration of support rods 11 as spindle holder base 9, instead of a plate section construction 10, as indicated for example schematically in FIG. 1, two support rods 11.1 and 11.2 are arranged in each plane, of a total of at least two planes, with only one of the planes being visible here. The support rods 11.1 and 11.2 for each plane cross one another at a coupling point or rotation point 18. The support rods 10 extend at a defined angle obliquely vertically between the spindle holder support 8 and a bottom element, such as for example a carriage 12 shown in FIGS. 1 to 7. At least one of the support rods 11 for each plane, particularly advantageously the first support rod 11.1 or else both support rods 11.1 and 11.2, advantageously comprises a spring joint in order to allow elastic bending or deformation of the support rods 11 and therefore deflection of the spindle unit 4 about an axis of rotation 19 which substantially continuously adapts itself during the movement of the device 1. It is also conceivable that a joint is formed at the rotation point 18, about which joint at least an upper V-shaped part of the support rods 11 can be rotated or tilted. For this purpose, a lower part of the support rods 11 is also formed as an inverted V, with the result that the two support rod portions meet at the rotation point 18. In this configuration, it is conceivable that the axis of rotation 19 is formed as a rigid, that is to say immovable, axis of rotation.

A displacement of the carriage 12 along the spindle unit longitudinal axis 30 also causes the entire spindle holder 7 to be displaced. This displacement allows an adjustment or setting of the desired or required axis of rotation 19 (as shown in FIG. 1) of the spindle unit 4 during its deflection. The excursion or the deflection of the output spindle 6 can advantageously also be set or adjusted by the movement of the carriage 12. The carriage 12 advantageously runs in linear rails (not shown here) which likewise extend along the spindle unit longitudinal axis 30.

Figure 2:
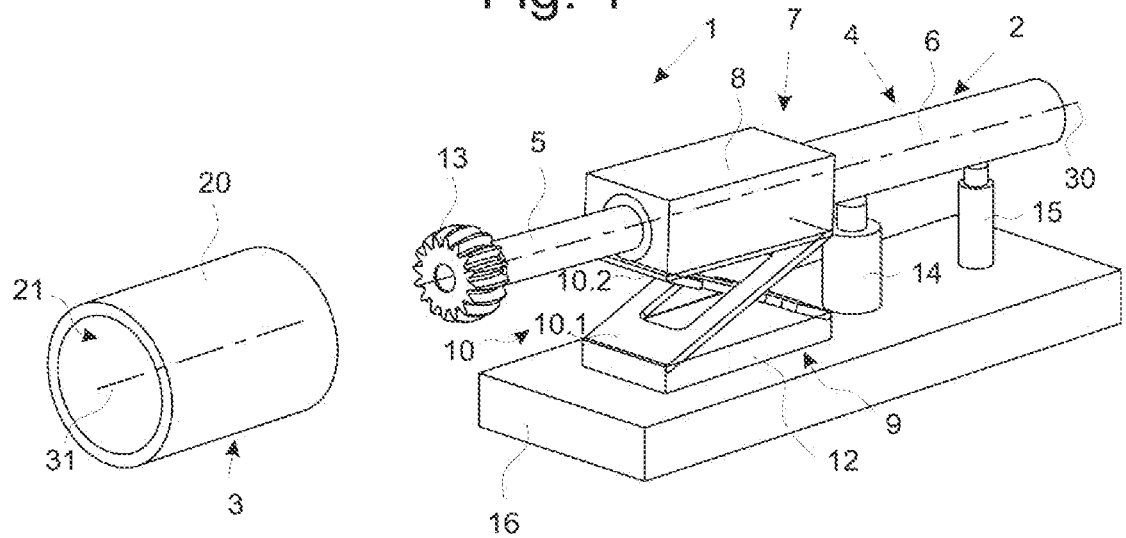
FIG. 2 is a perspective view of the example device shown in FIG. 1.
Figure 3:
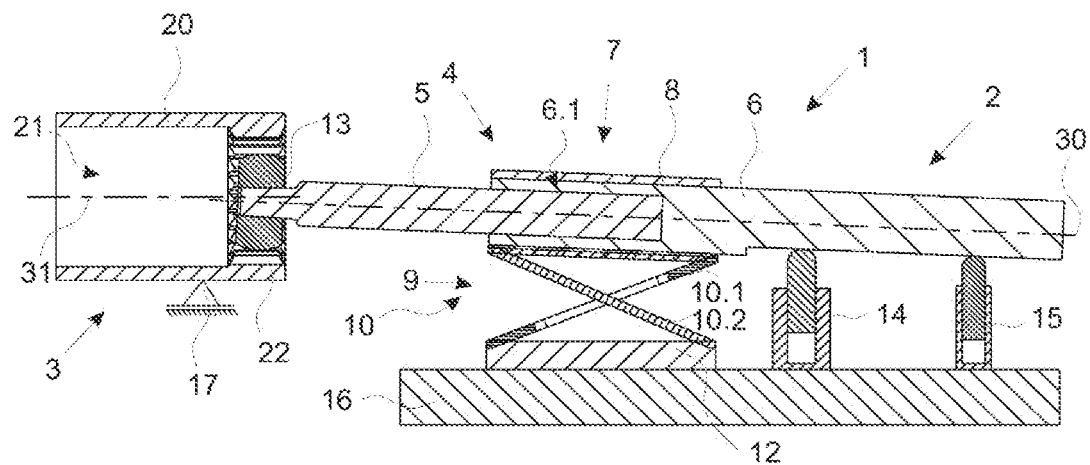
FIG. 3 is a lateral sectional view the example shown in FIGS. 1 and 2 of a device for concentricity measurement having a gauge gear wheel disposed in a retracted position.
Figure 4:
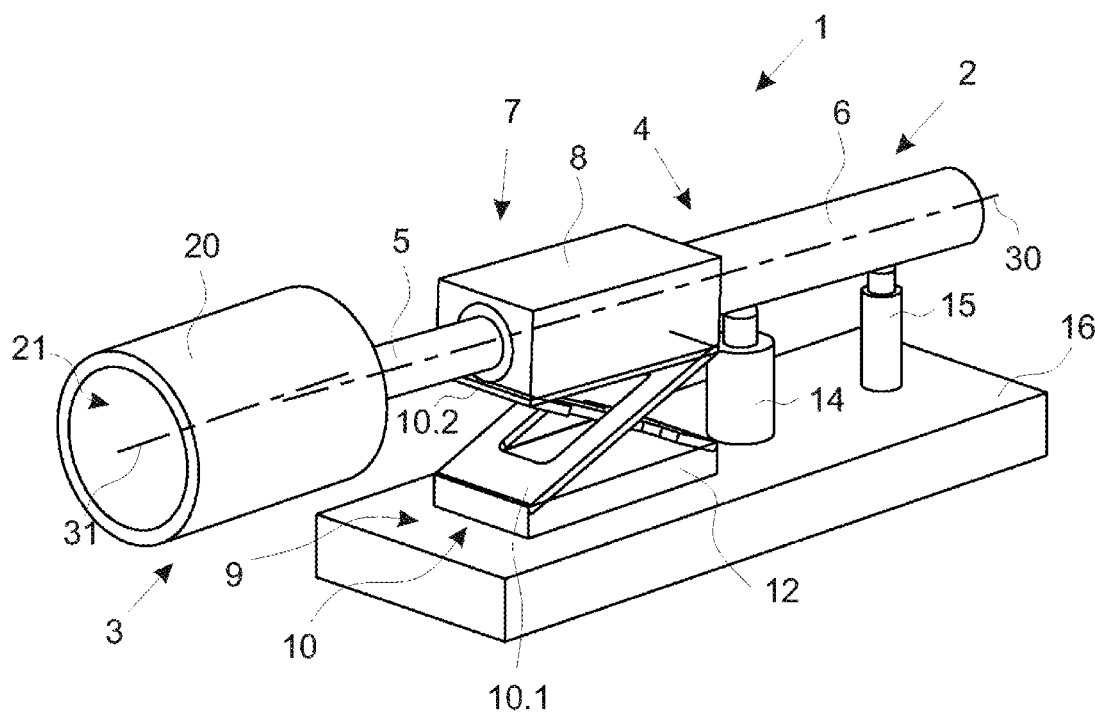
FIG. 4 is a perspective view of the example device shown in FIG. 3.
Figure 5:
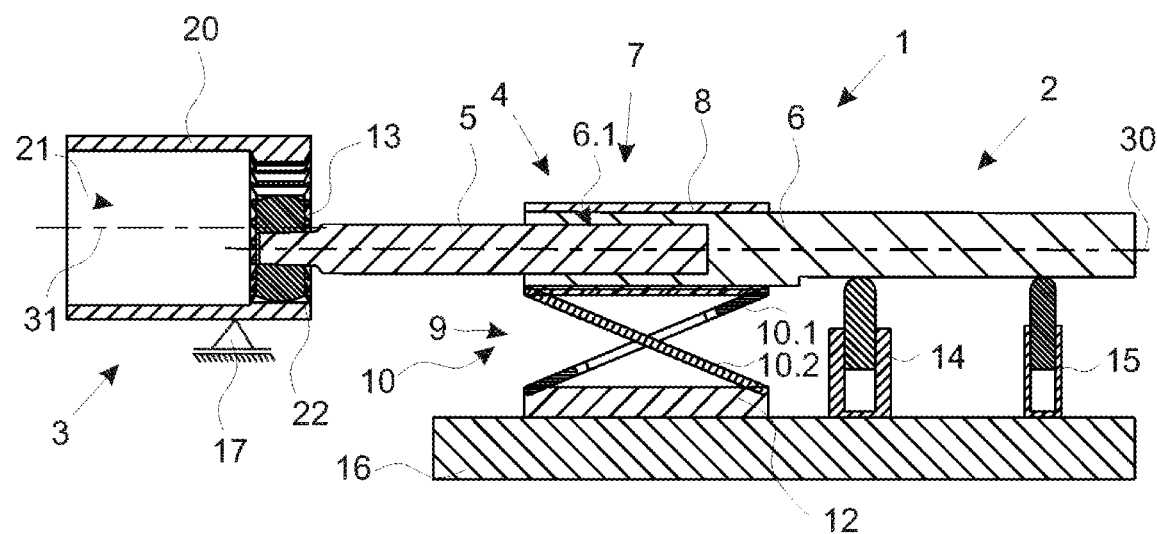
FIG. 5 is a lateral sectional view of the example shown in FIGS. 1-4 of a device for concentricity measurement having a gauge gear wheel disposed in an engagement position.
Figure 6:
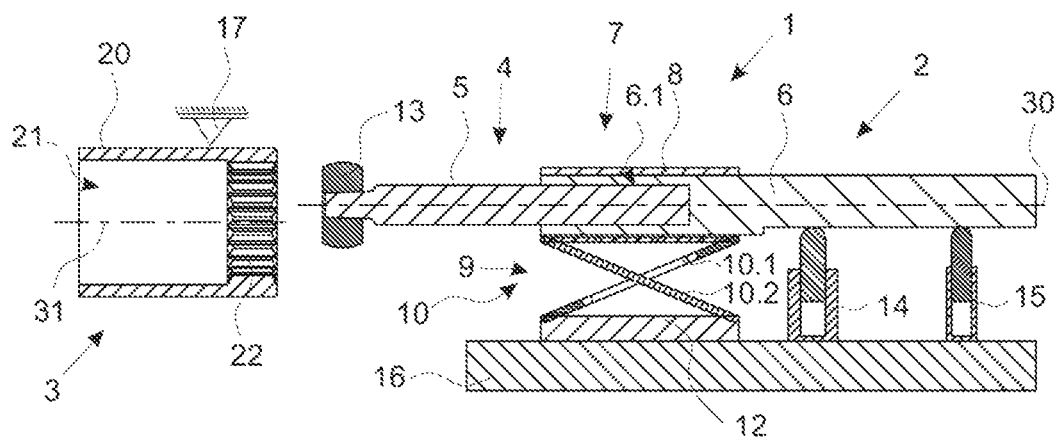
FIG. 6 is a lateral sectional view of the example shown in FIGS. 1-5 of a device for concentricity measurement having a gauge gear wheel disposed in the retracted position.
Figure 7:
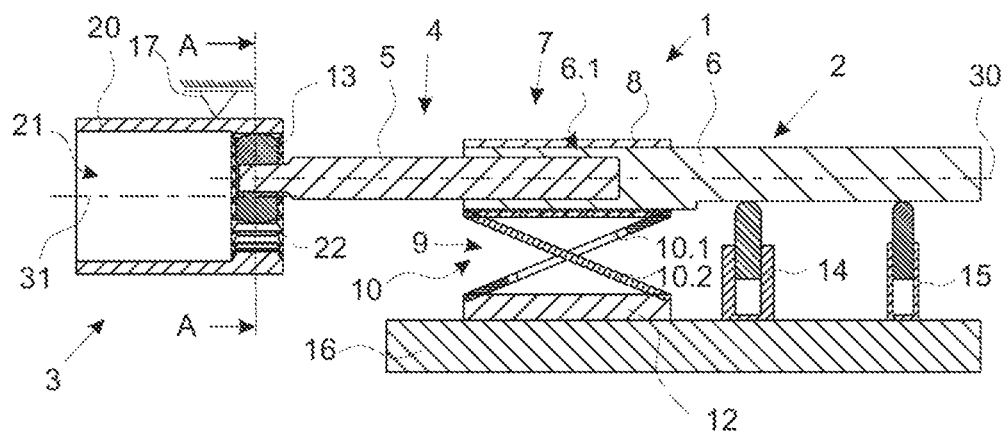
FIG. 7 is a lateral sectional view of the example shown in FIGS. 1-6 of a device for concentricity measurement having a gauge gear wheel disposed in the engagement position.

Furthermore, the determination segment 2 comprises an adjusting element 14 and a measuring unit 15 which are each operatively connected to the output spindle 6. The adjusting element 14 is for example a cylinder, such as a pneumatic pressure cylinder, and serves to deflect the spindle unit 4, and therefore the gauge gear wheel 13 connected to this spindle unit 4, from an inoperative position, as shown in FIGS. 1 and 2 or 6, into a retracted position, as shown in FIGS. 3 and 4, and from a retracted position into an engagement position, as shown in FIGS. 5 and 7. The measuring unit 15 is for example a measuring sensor which, during the measurement of the concentricity of the internal toothing 22 of the component 20, detects the deflections transmitted via the tapping spindle 5 to the output spindle 6 starting from the gauge gear wheel 13. It is conceivable that, as shown in FIGS. 1 to 7, the measuring unit 15 and the adjusting element 14 are arranged on a holding table 16. The holding table 16 is preferably displaceable in the direction of the spindle longitudinal axis 30. The holding table 16 is particularly advantageously movable in more than one degree of freedom, but can also additionally be moved in the horizontal direction, orthogonally to the spindle unit longitudinal axis and/or vertically and/or be tilted, in particular tilted forward and/or tilted laterally. It is conceivable that the carriage 12 is arranged on the holding table 16 and is advantageously movable thereon in the spindle unit longitudinal direction 30.

As shown in FIGS. 1 to 7, the device 1 also comprises a component-receiving segment 3 which serves to receive the component 20 and to hold it in a defined position, advantageously to rotate it about its component longitudinal axis 31. The component-receiving segment 3 comprises at least one bearing element 17, advantageously two bearing elements 17 which are configured to be spaced apart from one another as viewed in the direction of the component longitudinal axis 31, in order to allow sufficient process-reliable mounting of the component 20.

Figure 13:
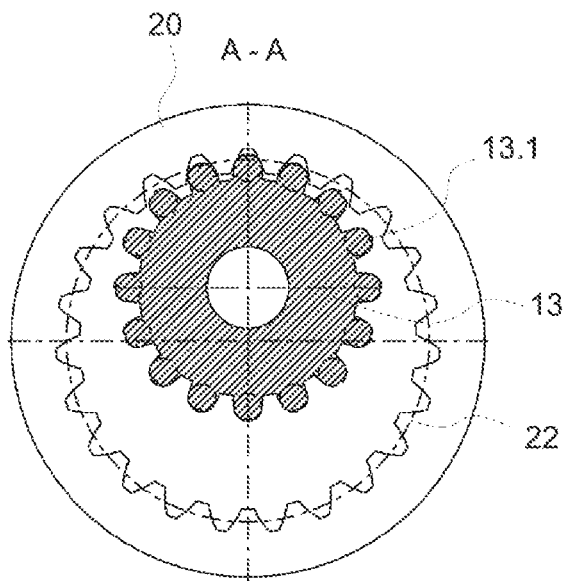
FIG. 13 is a cross-sectional view of a section A-A of the example shown in FIG. 7 of a device for concentricity measurement with another example gauge gear wheel disposed in an engagement position.
Figure 14:
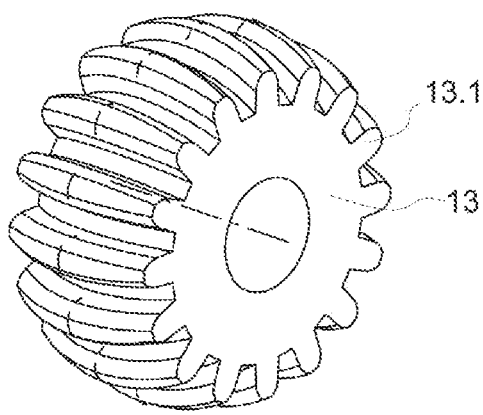
FIG. 14 is a perspective view of the example shown in FIG. 13 of a gauge gear wheel.
Figure 15:
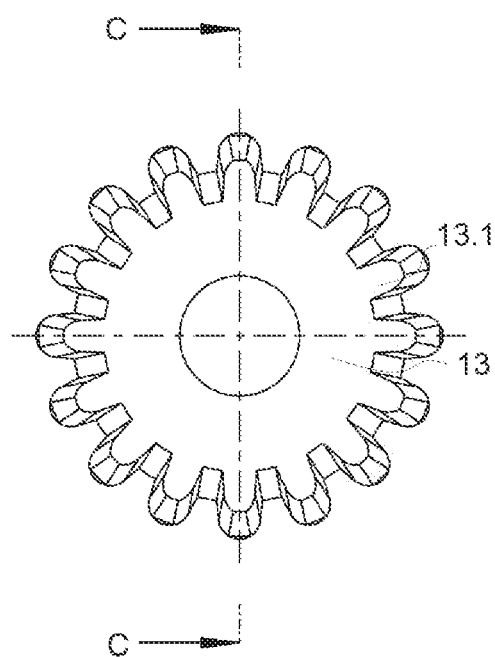
FIG. 15 is a cross-sectional view of the example shown in FIG. 14 of a gauge gear wheel.
Figure 16:
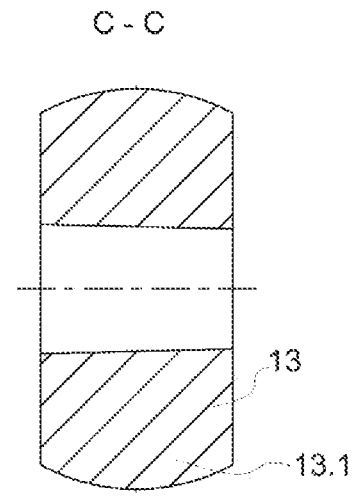
FIG. 16 is a cross-sectional view of a section C-C of the example gauge gear wheel shown in FIG. 15.

As shown in FIGS. 1 and 2 and 6, the spindle unit 4, and accordingly the gauge gear wheel 13, are situated in an inoperative position. In this position, the spindle unit 4 is not deflected and the gauge gear wheel 13 is not in engagement with the internal toothing 22, which is to be measured, of the component 20. In FIGS. 3 and 4, by contrast, a movement of the adjusting element 14, that is to say an activation or deactivation of the adjusting element 14 (depending on which tool is chosen as adjusting element), causes the spindle unit 4 to be deflected, that is to say moved or pivoted about a preferably nonrigid axis of rotation 19, as schematically shown in FIG. 1. As a result, the gauge gear wheel 13 is moved upward, in particular raised, substantially in the vertical direction. After a deflection of the spindle unit 4 has occurred, the holding table 16 is advantageously activated to carry out a movement along the spindle unit longitudinal axis 30 in the direction of the component-receiving segment 2. As a result, the gauge gear wheel 13 is introduced into a cavity 21 of the component 20, in which cavity the internal toothing 22 to be measured is formed. After positioning the gauge gear wheel 13 in a retracted position and introducing this gauge gear wheel 13 into the cavity 21 of the component 20, as shown in FIGS. 3 and 4, a renewed deflection of the spindle unit 4 occurs. This renewed deflection of the spindle unit 4 is again effected by the adjusting element 14 which, depending on the configuration of the tool, is activated or deactivated. During the renewed deflection, the spindle unit 4, and therefore the gauge gear wheel 13, are moved from the retracted position into an engagement position, as shown in FIGS. 5 and 7. A movement therefore again takes place here, in particular a tilting of the spindle unit about the nonstatic axis of rotation 19, as schematically shown in FIG. 1, with the result that the gauge gear wheel 13 is moved downward in the vertical direction. After the movement has been executed, the teeth of the gauge gear wheel 14 advantageously come into meshing engagement with a portion of the internal toothing 22 of the component 20, as also shown in FIGS. 5 and 7 and also in the following FIGS. 8, 9 and 13.

It is conceivable that the gauge gear wheel 13 is brought into engagement with the internal toothing 22 of the component 20 in such a way that it lies on a lower region of the internal toothing 22, as viewed in the vertical direction, through its weight force alone or advantageously in combination with the spring force of the spindle holder base 9 in order to have a required pressing force. This can be seen in particular in FIG. 5. An alternative to this is shown in FIG. 7. In this configuration, the gauge gear wheel 13 is brought into engagement with the internal toothing 22 of the component 20 in such a way that it engages in an upper region of the internal toothing 22, as viewed in the vertical direction. For this purpose, it is required to generate a corresponding contact pressure. The pressing force of the gauge gear wheel 13 that is required for this purpose is generated for example by means of the spindle holder 7, in particular the spindle holder base 9 in active cooperation with the adjusting element 14, which can exert a defined tensile force on the spindle unit 4 and therefore on the output spindle 6. Just as in the arrangement of the gauge gear wheel 13 in the lower region of the internal toothing 22, the application of the gauge gear wheel 13 needs to be preceded by a deflection or pivoting of the spindle unit 4 from an inoperative position, as shown in FIG. 6. In addition, it is also possible to move the entire holding table 16 upward in the vertical direction in order to allow process-reliable engagement of the gauge gear wheel 12 in the internal toothing 22. Furthermore, it is advantageous if the bearing element 17 is arranged above the arranged component 20 in order to allow a defined counterpressure when applying the contact pressure by the gauge gear wheel 13 to the internal toothing 22 at least during the measuring operation. The bearing element 17 can take the form of a steady rest.

It should accordingly be noted that, for the determination of the concentricity of an internal toothing 22 and in particular the detection of concentricity defects of this internal toothing 22 of a component 20, it is not relevant in which portion of the internal toothing 22, as viewed in the circumferential direction, the gauge gear wheel 13 is brought into meshing engagement with the internal toothing 22.

Figure 8:
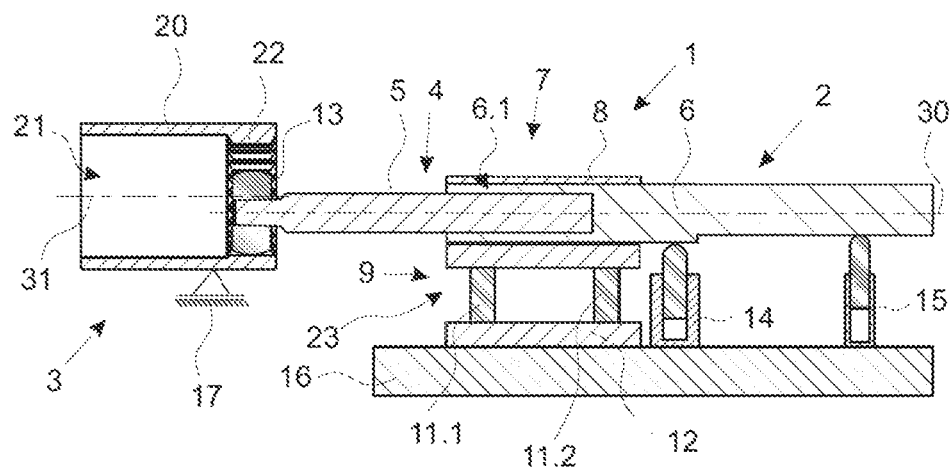
FIG. 8 is a lateral sectional view of another example device for concentricity measurement having a gauge gear wheel disposed in an engagement position.

FIG. 8 shows a further embodiment of the device 1 according to the invention. This embodiment differs from the embodiment shown in FIGS. 1 to 7 by virtue of a differently designed spindle holder base 9. The spindle holder base 9 shown in FIG. 8 is advantageously configured as a measuring carriage 23. Its measuring tip can advantageously pick up the gauge gear wheel 13. The measuring carriage can likewise comprise support rods 11.1 and 11.2, with these, however, being arranged parallel to one another. An adjustment and positioning of the spindle unit 4 relative to the internal toothing 22 to be measured is advantageously also conceivable by means of these support rods 11.1 and 11.2

FIGS. 9 to 12 show an embodiment of a gauge gear wheel 13 which comprises an involute toothing. This advantageously allows a constant transmission ratio with optimal running smoothness between the internal toothing 22 of the component 20 and the external toothing 13.1 of the gauge gear wheel 13.

An alternative configuration of the gauge gear wheel 13 is shown in FIGS. 13 to 16. The external toothing 13.1 of the gauge gear wheel 13 advantageously comprises so-called circular arc flanks. These circular arc flanks, analogously to a measuring ball, produce contact only in a center plane of the gauge gear wheel 13.

The two depicted configurations of the gauge gear wheel 13 comprise tooth heads which extend in rounded-off fashion in the axial direction of the gauge gear wheel 13. This advantageously also allows process-reliable engagement of the external toothing 13.1 of the gauge gear wheel 13 in the internal toothing 22 of the component 20 with tolerable deviations with regard to the parallelism of the spindle unit longitudinal axis 30 of the spindle unit 4 in relation to the component longitudinal axis 31 of the component 20.

LIST OF REFERENCE SIGNS

1 Device
2 Determination segment
3 Component-receiving segment
4 Spindle unit
5 Tapping spindle
6 Output spindle
6.1 Bearing portion
7 Spindle holder
8 Spindle holder support
9 Spindle holder base
10 Plate sections
10.1 First plate section
10.2 Second plate section
11 Support rod
11.1 First support rod
11.2 Second support rod
12 Carriage
13 Gauge gear wheel
13.1 External toothing of the gauge gear wheel
14 Adjusting element
15 Measuring unit
16 Holding table
17 Bearing element
18 Rotation point
19 Axis of rotation
20 Component
21 Cavity
22 Internal toothing
23 Measuring carriage
30 Spindle unit longitudinal axis
31 Component longitudinal axis
A-A Section
B-B Section
C-C Section

What is claimed is:
1. A device for measuring concentricity of an internal toothing of a component, the device comprising a determination segment for determining a concentricity deviation, the determination segment comprising:
   a spindle unit including
      a tapping spindle with a gauge gear wheel disposed on a first end of the tapping spindle and configured for tapping the concentricity of the internal toothing of the component, and
      an output spindle for transmitting the tapped concentricity from the tapping spindle to a measuring unit, wherein the output spindle is disposed directly or indirectly on a second end of the tapping spindle opposite the first end;
   a spindle holder for holding and positioning the tapping spindle, the output spindle, or the spindle unit, wherein the spindle holder is disposed on a carriage that is movable in an axial direction along a longitudinal axis of the spindle unit;
   an adjusting element for positioning the gauge gear wheel; and the measuring unit for comparing the tapped concentricity with reference values.

2. The device of claim 1 comprising a component-receiving segment for receiving the component, wherein the component-receiving segment comprises at least two bearing elements that are configured to be axially spaced apart and are for bearing and allowing a rotational movement of the component about a longitudinal axis of the component.

3. The device of claim 2 wherein at least one of the at least two bearing elements is a steady rest.

4. The device of claim 2 wherein the component-receiving segment comprises a drive unit for rotationally driving the component about the longitudinal axis of the component.

5. The device of claim 1 wherein the spindle holder comprises:
a spindle holder support for receiving the tapping spindle and the output spindle; and
a spindle holder base for moving the spindle unit.

6. The device of claim 5 wherein the spindle holder base is a plate section construction having plate sections that cross one another in a crossing axis, wherein the crossing axis extends horizontally and orthogonally to a longitudinal axis of the spindle unit.

7. The device of claim 1 comprising a component-receiving segment for receiving the component, wherein the determination segment or the component-receiving segment is disposed on a holding table that is steplessly movable in at least one degree of freedom.

8. The device of claim 1 wherein the adjusting element and the measuring unit are disposed on and operatively connected to the output spindle.

9. A device for measuring concentricity of an internal toothing of a component, the device comprising a determination segment for determining a concentricity deviation, the determination segment comprising:
a spindle unit including
a tapping spindle with a gauge gear wheel disposed on a first end of the tapping spindle and configured for tapping the concentricity of the internal toothing of the component, and
an output spindle for transmitting the tapped concentricity from the tapping spindle to a measuring unit, wherein the output spindle is disposed directly or indirectly on a second end of the tapping spindle opposite the first end;
a spindle holder for holding and positioning the tapping spindle, the output spindle, or the spindle unit, wherein the spindle holder comprises:
a spindle holder support for receiving the tapping spindle and the output spindle; and
a spindle holder base for moving the spindle unit, wherein the spindle holder base is elastically deformable about an axis of rotation;
an adjusting element for positioning the gauge gear wheel; and
the measuring unit for comparing the tapped concentricity with reference values.

10. A device for measuring concentricity of an internal toothing of a component, the device comprising a determination segment for determining a concentricity deviation, the determination segment comprising:
a spindle unit including
a tapping spindle with a gauge gear wheel disposed on a first end of the tapping spindle and configured for tapping the concentricity of the internal toothing of the component, and
an output spindle for transmitting the tapped concentricity from the tapping spindle to a measuring unit, wherein the output spindle is disposed directly or indirectly on a second end of the tapping spindle opposite the first end;
a spindle holder for holding and positioning the tapping spindle, the output spindle, or the spindle unit, wherein the spindle holder comprises:
a spindle holder support for receiving the tapping spindle and the output spindle; and
a spindle holder base for moving the spindle unit, wherein the spindle holder base comprises a lever arm construction having support rods that cross one another in a plane extending in an axial direction of a longitudinal axis of the spindle unit;
an adjusting element for positioning the gauge gear wheel; and
the measuring unit for comparing the tapped concentricity with reference values.

11. The device of claim 10 wherein at least one of the support rods comprises a spring joint.

* * * * *